(12) United States Patent
Savvides et al.

(10) Patent No.: US 9,171,226 B2
(45) Date of Patent: Oct. 27, 2015

(54) IMAGE MATCHING USING SUBSPACE-BASED DISCRETE TRANSFORM ENCODED LOCAL BINARY PATTERNS

(71) Applicant: Carnegie Mellon University, Pittsburgh, PA (US)

(72) Inventors: Marios Savvides, Pittsburgh, PA (US); Felix Juefei-Xu, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 121 days.

(21) Appl. No.: 14/038,167

(22) Filed: Sep. 26, 2013

(65) Prior Publication Data

US 2014/0212044 A1 Jul. 31, 2014

Related U.S. Application Data (60) Provisional application No. 61/744,436, filed on Sep. 26, 2012.

(51) Int. Cl.
G06K 9/46 (2006.01)

(52) U.S. Cl.
CPC ...... *G06K 9/4609* (2013.01); *G06K 2009/4666* (2013.01)

(58) Field of Classification Search
CPC ............ G06K 9/0061; G06K 9/00597; G06K 9/00275; G06K 9/00281; G06K 9/00604; G06K 9/00617; G06K 9/4642; G06K 9/00221; G06K 9/00228; G06K 9/62; G06K 9/6201; G06K 9/48; G06K 9/4609; G06K 9/00771; G06T 7/0081; G06T 7/0083
USPC ......... 382/117, 118, 114, 115, 159, 181, 103, 382/190, 191, 209, 224, 116, 131, 201, 202, 382/203, 207, 225, 260, 266, 274, 275, 299, 382/232, 280; 340/5.2, 5.21, 5.52, 5.82; 348/222.1, 239, 370; 358/448; 378/4
See application file for complete search history.

(56) References Cited

U.S. PATENT DOCUMENTS

| | | | | |
|---|---|---|---|---|
| 8,538,139 B2* | 9/2013 | Kameyama | .................... | 382/159 |
| 8,571,273 B2* | 10/2013 | Li et al. | .......................... | 382/118 |
| 8,639,038 B2* | 1/2014 | Robles-Kelly et al. | ........ | 382/207 |
| 8,971,628 B2* | 3/2015 | Susanu et al. | .................. | 382/181 |

* cited by examiner

*Primary Examiner* — Sheela Chawan
(74) *Attorney, Agent, or Firm* — Downs Rachlin Martin PLLC (57) ABSTRACT

Determining a match between the subjects of first and second images as a function of decimal-number representations of regions of the first and second images. The decimal-number representations are generated by performing discrete transforms on the regions so as to obtain discrete-transform coefficients, performing local-bit-pattern encoding of the coefficients to create data streams, and converting the data streams to decimal numbers. In one embodiment, the first and second images depict periocular facial regions, and the disclosed techniques can be used for face recognition, even where a small portion of a person's face is captured in an image. Subspace modeling may be used to improve accuracy.

22 Claims, 7 Drawing Sheets

| 0 | 0 | 0 | 0 | 0 | 0 | 1 |
|---|---|---|---|---|---|---|
| 0 | 0 | 1 | 1 | 0 | 0 | 0 |
| 0 | 0 | 1 | 0 | 1 | 1 | 1 |
| 0 | 0 | ⓪ |   | 1 | 0 | 0 |
| 0 | 1 | 0 | 0 | 0 | 0 | 0 |
| 1 | 0 | 1 | 0 | 1 | 0 | 0 |
| 1 | 0 | 0 | 1 | 0 | 0 | 0 |

| 0 | 0 | 0 | 0 | 0 | 0 | 1 |
|---|---|---|---|---|---|---|
| 0 | 0 | 1 | 1 | 0 | 0 | 0 |
| 0 | 0 | 1 | 0 | 1 | 1 | 1 |
| 0 | 0 | ⓪ |   | 1 | 0 | 0 |
| 0 | 1 | 0 | 0 | 0 | 0 | 0 |
| 1 | 0 | 1 | 0 | 1 | 0 | 0 |
| 1 | 0 | 0 | 1 | 0 | 0 | 0 |

FIG. 4A  FIG. 4B  FIG. 4C

| 0 | 1 | 1 | 1 | 0 | 1 | 1 |
|---|---|---|---|---|---|---|
| 1 | 1 | 1 | 1 | 0 | 1 | 0 |
| 1 | 1 | ① |   | 1 | 1 | 1 |
| 0 | 0 | 1 | 1 | 1 | 1 | 1 |
| 1 | 1 | 1 | 0 | 1 | 1 | 0 |
| 1 | 0 | 1 | 0 | 1 | 1 | 1 |
| 1 | 1 | 0 | 1 | 1 | 0 | 1 |

| 0 | 1 | 1 | 1 | 0 | 1 | 1 |
|---|---|---|---|---|---|---|
| 1 | 1 | 1 | 1 | 0 | 1 | 0 |
| 1 | 1 | 1 |   | ① | 1 | 1 |
| 0 | 0 | 1 | 1 | 1 | 1 | 1 |
| 1 | 1 | 1 | 0 | 1 | 1 | 0 |
| 1 | 0 | 1 | 0 | 1 | 1 | 1 |
| 1 | 1 | 0 | 1 | 1 | 0 | 1 |

IMAGE MATCHING USING SUBSPACE-BASED DISCRETE TRANSFORM ENCODED LOCAL BINARY PATTERNS

RELATED APPLICATION DATA

This application claims the benefit of priority of U.S. Provisional Patent Application Ser. No. 61/744,436, filed Sep. 26, 2012, and titled "Discrete Transform Encoded Local Binary Patterns As Feature Descriptors", which is incorporated by reference herein in its entirety.

STATEMENT OF GOVERNMENT INTEREST

Subject matter of this disclosure was made with government support under Army Research Office grants DAAD19-02-1-0389 and W911NF-09-1-0273. The government may have certain rights in this subject matter.

FIELD OF THE INVENTION

The present invention generally relates to the field of image processing. In particular, the present invention is directed to image matching using subspace-based discrete transform encoded local binary patterns.

BACKGROUND

Face recognition is one of the most difficult and challenging tasks in computer vision, partly because of large variations in human faces; this is particularly true when only a portion of a face is available for analysis. Researchers have been developing technologies for face recognition based on partial-face images due to the demands of many real-world operating scenarios that require accurate, efficient, uncooperative, and cost-effective solutions. Some of these technologies identify local binary patterns (LBP) in raw pixel intensities but nonetheless fail to achieve accurate, efficient, uncooperative, and cost-effective solutions, largely due to the minimal amount of useful data that can be provided by a partial-face image.

To achieve an accurate, efficient, uncooperative, and cost-effective solution to the problem of face recognition in situations where only a portion of a face is available for analysis, it becomes necessary to extract as much unique information as possible from each image in question and to use such information in an exhaustive comparison. However, these methods are known to be computationally expensive and may require special tweaking in order to generate meaningful results. More accurate and efficient face recognition methods are desired in numerous applications, which demand near real-time computation and do not require user cooperation. Applications include automated face recognition in surveillance images and access control, among others.

SUMMARY OF THE DISCLOSURE

It is understood that the scope of the present invention is limited to the scope provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted).

In one implementation, the present disclosure is directed to a method of matching first features of first image data with second features of second image data. The method includes receiving, by a feature-matching system, the first image data; applying, by the feature-matching system, a discrete transform to a region of the first image data containing the first features so as to generate a first set of transform coefficients; executing, by the feature-matching system, a local binary pattern (LBP) encoding algorithm to encode the first set of transform coefficients into a set of first encoded data streams; converting, by the feature-matching system, each of the first encoded data streams into a decimal number so as to create a first decimal-number representation of the region of the first image data; and executing, by the feature-matching system, a matching algorithm for determining a match as a function of the first decimal number representation and a second decimal representation of a region of the second image data containing the second features.

In another implementation, the present disclosure is directed to a machine-readable storage medium containing machine-executable instructions for performing a method of matching first features of first image data with second features of second image data. The machine-executable instructions include a first set of machine-executable instructions for receiving the first image data; a second set of machine-executable instructions for applying a discrete transform to a region of the first image data containing the first features so as to generate a first set of transform coefficients; a third set of machine-executable instructions for executing a local binary pattern (LBP) encoding algorithm to encode the first set of transform coefficients into a set of first encoded data streams; a fourth set of machine-executable instructions for converting each of the first encoded data streams into a decimal number so as to create a first decimal-number representation of the region of the first image data; and a fifth set of machine-executable instructions for executing a matching algorithm for determining a match as a function of the first decimal number representation and a second decimal representation of a region of the second image data containing the second features.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to methods and software that include steps and/or machine-readable instructions for matching features, such as surface texture, change in structure, etc., of first image data (e.g., a digital or digitized photograph or other visual image) with like features of second image data. The present inventors have discovered that verification rates for feature-matching of images is greatly improved by not only performing a discrete transform on the portions of the first and second images (image data) being compared, but also by converting local binary pattern (LBP) data to decimal numbers prior to performing any matching algorithm. As will be appreciated by those skilled in the art after reading this entire disclosure, the methodologies disclosed herein can be used to accurately perform virtually any sort of image matching, including facial recognition. As an example, methodologies presented herein are particularly useful when only a portion of a face, such as a the periocular region or portion thereof, is available for matching.

Figure 1:
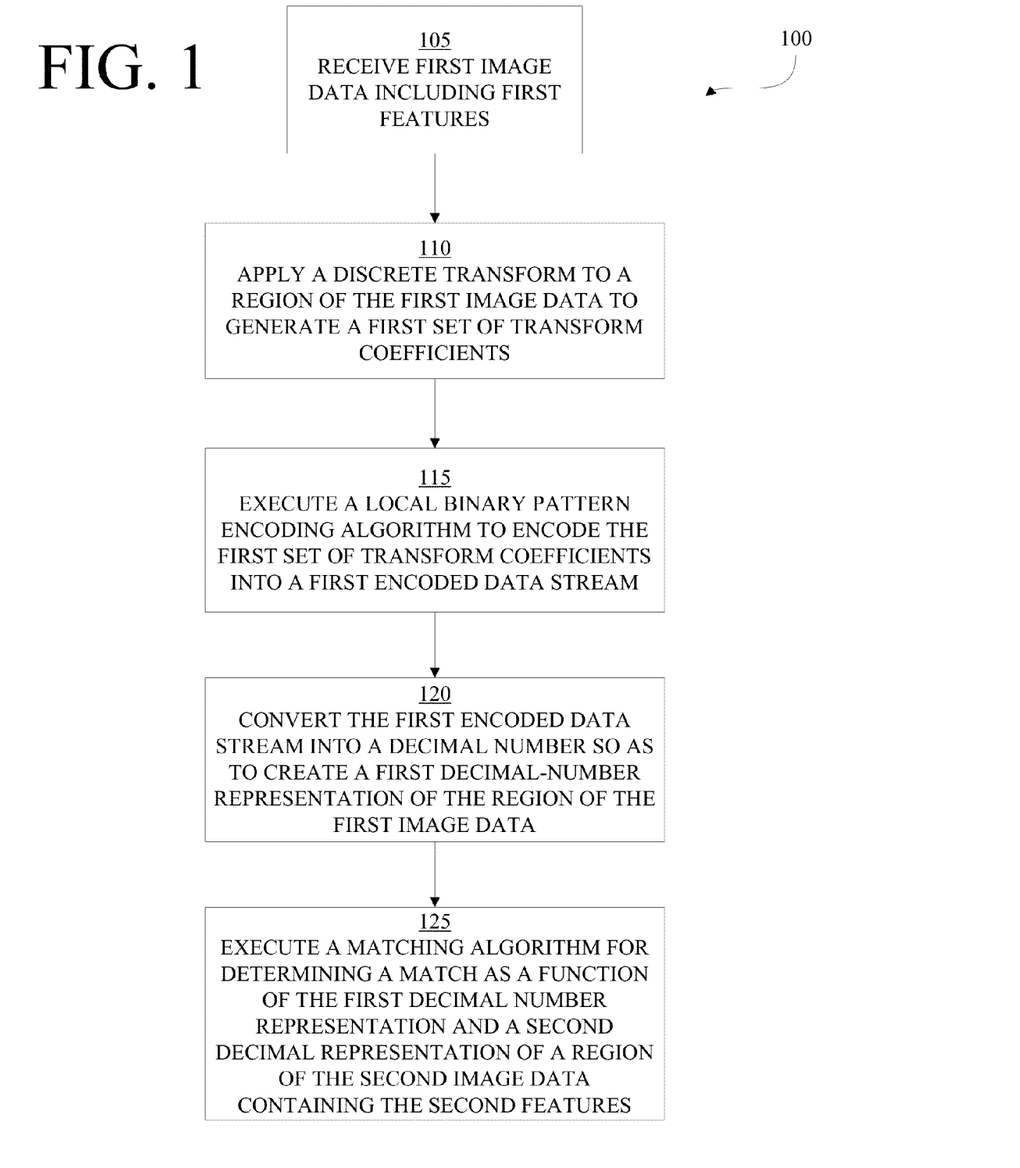
FIG. 1 is a flow diagram illustrating a method of matching first features of first image data with second features of second image data.
Figure 2:
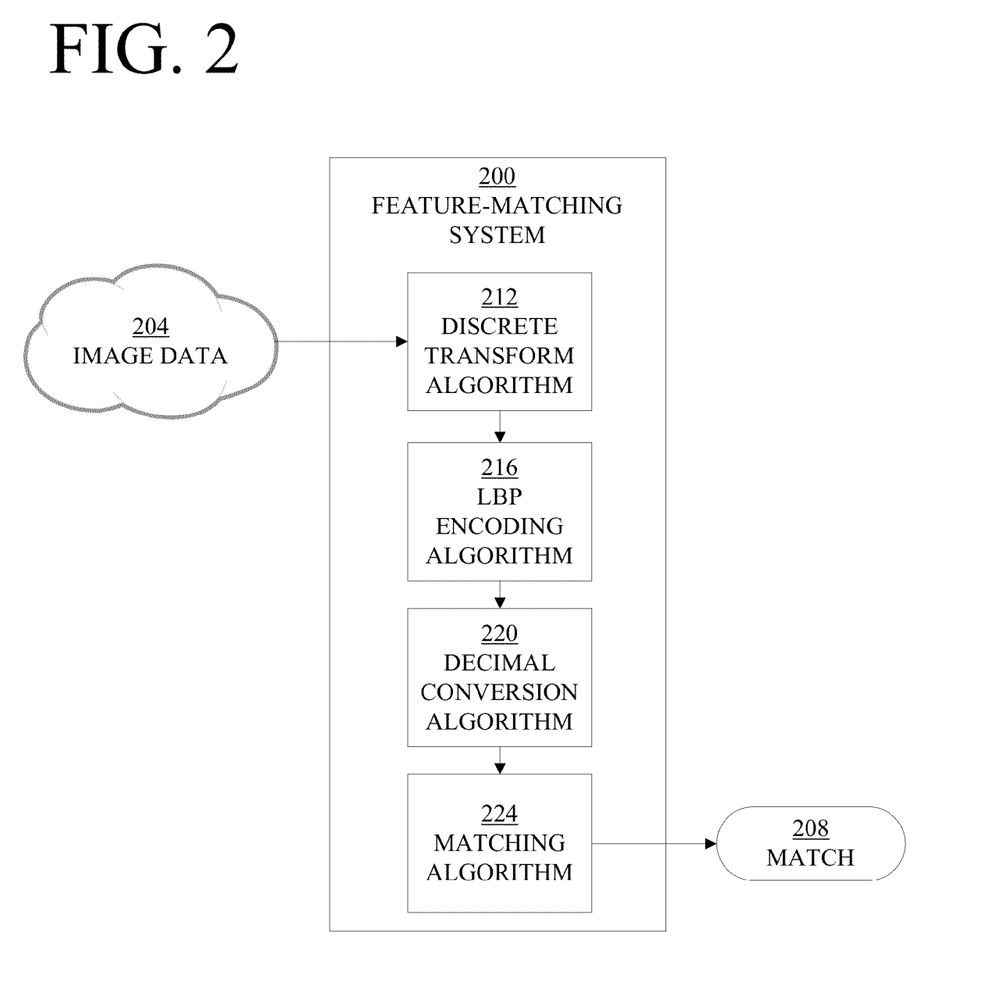
FIG. 2 is a high-level block diagram of a feature-matching system made in accordance with the present disclosure.
Figure 7:
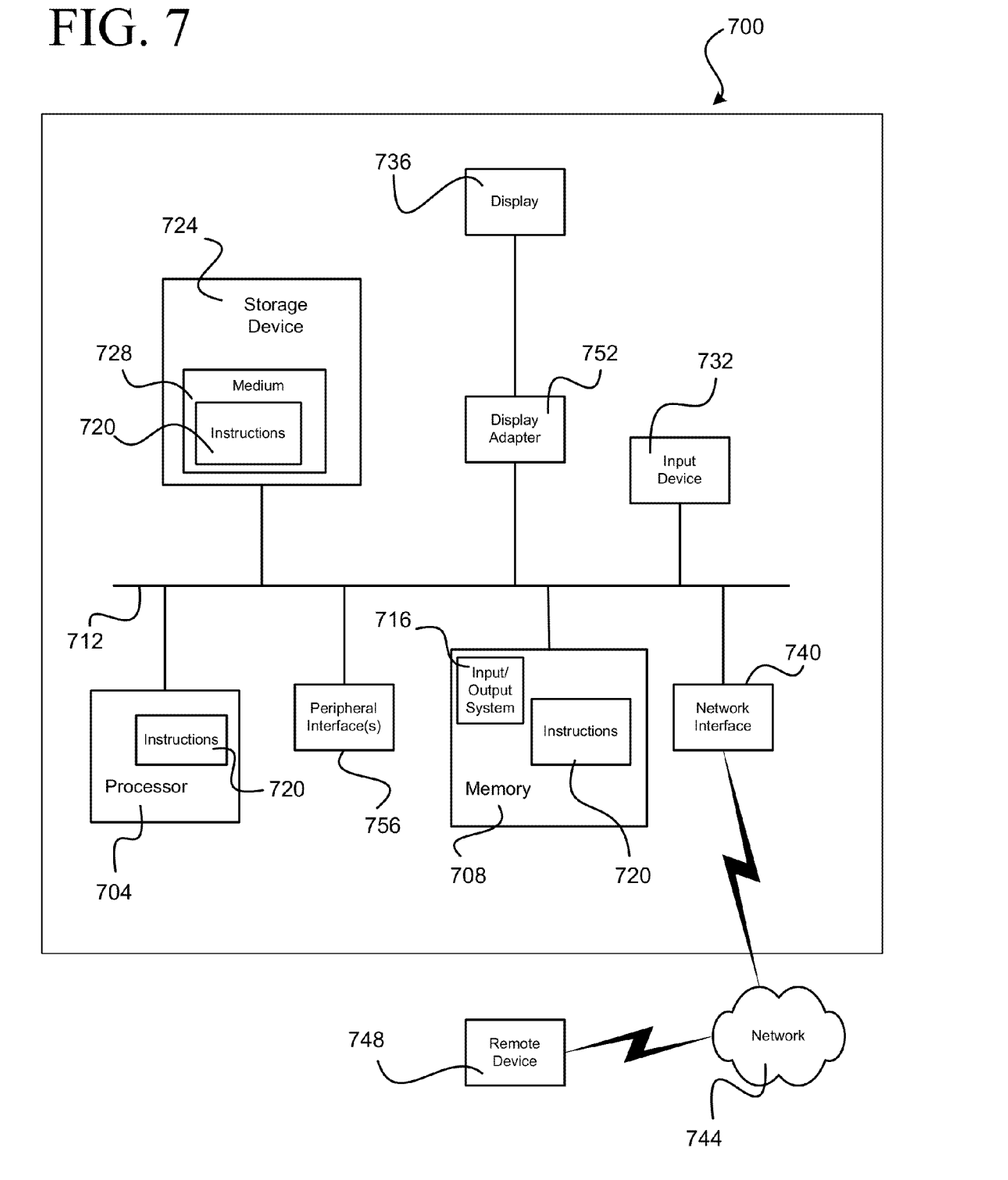
FIG. 7 is a diagram illustrating a machine that can implement methods of the present disclosure and/or various portions of such methods.

Referring now to the drawings, FIG. 1 illustrates an exemplary method 100 of matching first features of first image data with second features of second image data. At step 105, first image data is received by a feature-matching system, which may be any one or computing devices that generally are: 1) programmed with instructions for performing steps of a method of the present disclosure; 2) capable of receiving and/or storing data necessary to execute such steps; and 3) capable of providing any user interface that may be needed for a user to interact with the system, including setting the system up for a matching session and viewing matching results, among other things. Those skilled in the art will readily appreciate that a feature-matching system of the present disclosure can range from a self-contained device, such as a smartphone, tablet computer, laptop computer, desktop computer, sever, web-server, to a network of two or more of any of these devices. Fundamentally, there is not limitation on the physical construct of the feature-matching system, as long as it can provided the features and functionality described herein. FIGS. 2 and 7, described more fully below, illustrate exemplary systems 200, 700 that can be used to implement various steps of method 100 or any other method incorporating features/functionality disclosed herein. For example, method 100 may be performed by a feature-matching system 200 that may receive image data 204 and generate a recognized match 208.

Typically, the first image data received at step 105 represents an image of one or more persons or objects suspected or at least hoped to be present in at least one other image for which image data, such as the second image data mentioned above. In the context of human identification, for example, facial recognition, the first image data contains an image of an unidentified person, and the second image data represents an image of an identified person, and the hope is to be able to match the unidentified person with the identified person. Those skilled in the art will readily appreciate that such matching of an identified person typically involves matching the image data for the unidentified person with many (e.g., hundreds, thousands, or more) sets of image data corresponding to many identified persons. Those skilled in the art will readily appreciate that the image data will typically be utilized by method 100 in the form of a digital image contained in a suitable image file, such as a JPG file, a GIF file, a PNG file, a TIF, or a RAW file, among others. Consequently, the term "image" and like terms as used herein refer not only to a print image, an electronically rendered image, etc., but also to the image-defining content of 1) a digital image file, 2) a signal, 3) a digital memory, or 4) other medium containing that information. Step 105 may be performed by feature-matching system 200 of FIG. 2. It is important to note that although image data 204 is represented outside of feature-matching system 200 in FIG. 2, image data 204 may be stored in feature-matching system using an appropriate computer storage system (see, e.g., FIG. 7). Image data 204 may be received from a database, through the Internet, from a security camera, and/or in any other manner known in the art to be suitable for providing image data, and any combination thereof.

At step 110, a discrete transform is applied to one or more regions of interest of the first image data. The region(s) of interest are the one or more regions of the image containing first features that are desired or at least suspected to effect a match with like features in the second image. It is noted that a region of interest may be an entire image or a portion thereof. In the context of periocular-based facial recognition, the first features may include eyebrows, eye folds, and eyelid contours, among others, or a portion or portions of each. Fundamentally, there is no limitation on the nature and character of the features than can be used as the first features, so long as they are features present or suspected to be present in each of the images, such as the second image, against which the first image data will be compared with a goal of generating a positive match. Step 110 may be performed by a discrete transform algorithm 212 of feature-matching system 200; such an algorithm 212 may include various discrete transform algorithms, specifications, etc.

Figure 3:
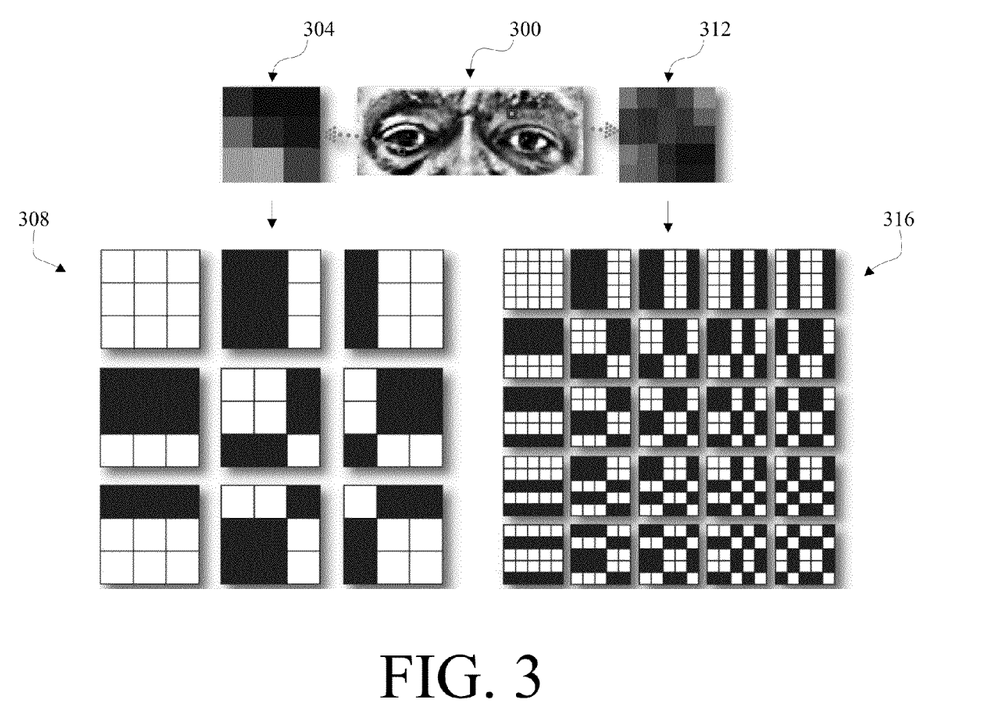
FIG. 3 illustrates potential basis images associated with coefficients that can be generated by executing a discrete transform on individual regions of an image.

FIG. 3 illustrates two examples of applying a discrete transform to a region of interest, here a periocular region 300 of a human face. In the left-hand-side (relative to FIG. 3) example, region 300 is analyzed in 3×3 patches, one of which, i.e., patch 304, is shown. In an exemplary embodiment, overlapping patches are analyzed separately in order to extract as much information as possible, though non-overlapping patches may be used to reduce computational expense. In discrete-transformation step 110, transform coefficients (not shown) for all of the patches of region 300 are generated using a 3×3 matrix of basis images 308, each of which corresponds to a 3×3 set of pixel values. Whereas the left-hand-side example uses 3×3 sets, the right-hand-side example uses 5×5 sets. That is: image patch 312 is a 5×5 patch of pixels; a 5×5 matrix of transform-basis images (collectively, 316) is used; and each basis image represents a 5×5 pixel area. A result of performing the discrete transform at step 110 is the generation of a first set of transform coefficients representing the region(s) of interest within the first image data, the first set of transform coefficients comprising each set of transform coefficients generated from each corresponding patch.

Any of various discrete transforms can be judiciously chosen in order to improve accuracy, depending on image quality or other factors. For example, in one embodiment, a Walsh-Hadamard transform may be used. Local image characteristics can be captured by convolution filters such as Walsh masks. The Walsh functions may be used to construct a complete and orthonormal basis in terms of which any matrix of a certain size may be expanded. In an embodiment, Walsh masks may be used to approximate the Walsh-Hadamard transform.

The Walsh matrices consist of two binary patterns, 1s and −1s. Depending on kernel size, those two patterns can be used to represent the local structure of an image. If a 5×5 kernel window is to be considered "local," the Walsh filters used must correspond to the 5-sample-long discrete versions of the Walsh function. Each set of these filters expands the 5×5 image patch in terms of a complete basis of elementary images. The Walsh function is shown in Equation 1, wherein $$\left\lfloor \frac{2}{j} \right\rfloor$$

means the integer part of j/2, q is either 0 or 1.

$$W_{2j+q}(t) = (-1)^{\lfloor \frac{2}{j} \rfloor + q}[W_j(2t) + (-1)^{j+q}W_j(2t-1)] \quad \text{(Equation 1)}$$

Following expansion, each function can be sampled at the integer points only so as to produce five vectors each consisting of five values. Any combination of Walsh vectors can be used to produce basis images. As illustrated in FIG. 3, there are nine possible patterns using a 3×3 patch and 25 possible patterns using a 5×5 patch. In one embodiment, an image may be expanded in terms of Walsh elementary functions of even size according to Equation 2. In this case, the transform matrix, W, the input image neighborhood, $f$, and the output transform, g, are all of the same size, N×N (N being an even number). An even size transformation matrix constructed from Walsh functions is orthogonal, thus its inverse is its transpose.

$$g = WfW^T \quad \text{(Equation 2)}$$

Odd-sized Walsh vectors yield an odd-sized Walsh transformation matrix; such a matrix is no longer orthogonal. In order to invert Equation 2, the inverse of W can be used, which results in Equation 3.

$$W^{-1}g(W^T)^{-1} = f \quad \text{(Equation 3)}$$

As such, the inverse of the matrix W can be used to process the image according to Equation 4.

$$g = (W^{-1})fW^{-1} \quad \text{(Equation 4)}$$

Alternatively or additionally, a discrete cosine transform may be used. In this case, a discrete cosine transform is applied on each N×N patch in the original image to generate $N^2$ coefficients corresponding to $N^2$ basis images. The source patch is transformed to a linear combination of these $N^2$ basis images, which are the combination of horizontal and vertical frequencies as shown in Equation 5.

$$X_{k_1,k_2} = \sum_{m_1=0}^{M_1-1} \sum_{m_2=0}^{M_2-1} x_{m_1,m_2} \times \cos\left[\frac{\pi}{M_1}\left(m_1 + \frac{1}{2}\right)k_1\right] \cos\left[\frac{\pi}{M_2}\left(m_2 + \frac{1}{2}\right)k_2\right] \quad \text{(Equation 5)}$$

Further alternatively or additionally, a discrete Fourier transform may be used. A two-dimensional discrete Fourier transform of an input image $f(x,y)$ is commonly defined by Equation 6, wherein u=0, 1, M−1, and v=0, 1, N−1.

$$F(u, v) = \frac{1}{\sqrt{MN}} \sum_{x=0}^{M-1} \sum_{y=0}^{N-1} f(x, y)e^{-j2\pi(ux/M + vy/N)} \quad \text{(Equation 6)}$$

Image processing using a two-dimensional discrete Fourier transform would result in complex coefficients and both magnitude and phase of the coefficients can be useful for image reconstruction. Because magnitude determines the contribution of each component while phase determines which components are present, phase may be more important in the context of image reconstruction using the inverse discrete Fourier transform. However, in some situations, the magnitude components themselves may be sufficient to satisfy desired intra-coefficient spatial characteristics.

Yet further alternatively or additionally, a discrete Hartley transform may be used. The discrete Hartley transform is a real-valued transform which produces real output for a real input and possesses the formula for its own inverse. In one embodiment, a rounded Hartley transform may be used, which is a transform with zero multiplicative complexity. The rounded Hartley transform therefore has computational advantages over the discrete Hartley transform. The spectrum derived from the rounded Hartley transform is a good estimation of a true Hartley spectrum and therefore can be used to estimate the discrete Hartley transform. The definition and the philosophy behind the rounded Hartley transform can be explained as follows: let v be an n-dimensional vector with real elements. The discrete Hartley transform establishes a pair of signal vectors $$v \xleftrightarrow{\mathcal{H}} V,$$

wherein the elements of V are defined according to Equation 7, in which $cas(\theta) \triangleq \cos(\theta) + \sin(\theta)$ $$V_k \triangleq \sum_{i=0}^{n-1} v_i cas\left(\frac{2\pi ik}{n}\right), k = 0, 1, \ldots, n-1 \quad \text{(Equation 7)}$$

This transform leads to the definition of Hartley matrix, H, whose elements are of the form $$h_{i,k} = cas\left(\frac{2\pi ik}{n}\right).$$

The rounded Hartley matrix can be obtained by rounding off elements of the Hartley matrix. Thus the rounded Hartley matrix elements $\hat{h}_{i,k}$ are defined according to Equation 8, wherein the square brackets are used to denote the round-off function.

$$\hat{h}_{i,k} \triangleq \left[ cas\left(\frac{2\pi ik}{n}\right) \right]_{h_{i,k}}, i, k = 0, 1, \cdots, N-1 \quad \text{(Equation 8)}$$

The original two-dimensional discrete Hartley transform of an N×N image A is defined according to Equation 9, wherein $a_{i,j}$ are the elements of an image A and $b_{u,v}$ are the elements of the Hartley transform of A.

$$b_{u,v} = \sum_{i=0}^{n-1} \sum_{j=0}^{n-1} a_{i,j} \text{cas}\left(\frac{ui+vj}{n}\right) \quad \text{(Equation 9)}$$

In order to determine the rounded Hartley transform, a temporary matrix T can be calculated according to the equation $T = \tilde{H}_n \cdot A \cdot \tilde{H}_n$, where $\tilde{H}_n$ is the rounded Hartley matrix of order n. This is equivalent to taking a one-dimensional discrete Hartley transform of the rows and then transforming the columns. Establishing that the elements of T are represented in the form $t_{i,j}$ for $(i, j=0, 1, \ldots, n-1)$, three new matrices can be generated from the temporary matrix T: $T^{(c)}$, $T^{(r)}$, and $T^{(cr)}$, whose elements are $t_{(i, n-j \bmod n)}$, $t_{(n-i \bmod n, j)}$, and $t_{(n-i \bmod n, n-j \bmod n)}$, respectively. As a result, the rounded Hartley transform of an n×n image can be determined using Equation 10.

$$RHT \triangleq T + T^{(c)} + T^{(r)} - T^{(cr)} \quad \text{(Equation 10)}$$

Still further alternatively or additionally, a discrete Legendre polynomial transform may be used. Legendre polynomials, also called Legendre functions, are solutions of the Legendre differential equation of Equation 11.

$$\frac{d}{dx}\left[(1-x^2)\frac{d}{dx}P_n(x)\right] + n(n+1)P_n(x) = 0 \quad \text{(Equation 11)}$$

The Legendre differential equation can be solved using a standard power series method. The solutions form a polynomial sequence: the Legendre polynomials. The two-dimensional Legendre polynomial transform (Legendre moments) of an image intensity function $f(x, y)$ is defined according to Equation 12.

$$\lambda_{mn} = \frac{(2m+1)(2n+1)}{4} \int_{-1}^{1} \int_{-1}^{1} P_m(x) P_n(x) f(x,y) \, dx \, dy \quad \text{(Equation 12)}$$

However, the region of definition of a Legendre polynomial is the interior of the unit circle, so any rectangular image will have to be scaled to the region $-1 < x, y < 1$. For a rectangle of size M×N, the Legendre polynomial transform can be determined according to Equation 13.

$$\lambda_{mn} = \frac{(2m+1)(2n+1)}{4MN} \times \sum_{x=0}^{M-1} \sum_{y=0}^{N-1} P_m\left(-1 + \frac{2x}{M-1}\right) P_n\left(-1 + \frac{2y}{N-1}\right) f(x,y) \quad \text{(Equation 13)}$$

Yet still further alternatively or additionally, a discrete Chebyshev polynomial transform may be used. Chebyshev polynomials are solutions to the Chebyshev differential equations, included herein as Equations 14 and 15, for the polynomials of the first and second kind respectively.

$$(1-x^2)\frac{d^2y}{dx^2} - x\frac{dy}{dx} + n^2 y = 0 \quad \text{(Equation 14)}$$

$$(1-x^2)\frac{d^2y}{dx^2} - 3x\frac{dy}{dx} + n(n+2)y = 0 \quad \text{(Equation 15)}$$

In some implementations, such as image processing, Chebyshev polynomials of the first kind may be more important than the second kind; as such, it may be preferable to use the first kind. An explicit representation of Chebyshev polynomials is given in Equation 16. The discrete Chebyshev polynomial transform for a rectangular image of size M×N can be determined according to Equation 17.

$$T_n(x) = \frac{n}{2} \sum_{k=0}^{\lfloor n/2 \rfloor} (-1)^k \frac{(n-k-1)!}{k!(n-2k)!} (2x)^{n-2k} \quad \text{(Equation 16)}$$

$$\tau_{pq} = \frac{1}{\varrho(p,M)\varrho(q,N)} \sum_{x=0}^{M-1} \sum_{y=0}^{N-1} T_m(x) T_n(y) f(x,y) \quad \text{(Equation 17)}$$

Yet still even further alternatively or additionally, a discrete Hermite polynomial transform may be used. The Hermite polynomials are solutions to Equation 18, where $\lambda$ is a constant with the boundary conditions that u be bounded polynomially at infinity.

$$\frac{d}{dx}\left(e^{-\frac{x^2}{2}} \frac{du}{dx}\right) + \lambda e^{-\frac{x^2}{2}} u = 0 \quad \text{(Equation 18)}$$

By solving Equation 17, the Hermite polynomial transform for rectangular images of size M×N can be determined according to Equation 19, wherein a is the standard deviation of the Gaussian function.

$$\hbar_{pq} = \sum_{x=0}^{M-1} \sum_{y=0}^{N-1} H_p\left(\frac{x}{\sigma}\right) H_q\left(\frac{y}{\sigma}\right) f(x,y) \quad \text{(Equation 19)}$$

A discrete Laguerre polynomial transform may also be alternatively or additionally used. The generalized Laguerre polynomials are solutions of the generalized Laguerre's equation, included herein as Equation 20, and can be expressed by the Rodrigues' formula, included herein as Equation 21.

$$x\frac{d^2y}{dx^2} + (\alpha + 1 - x)\frac{dy}{dx} + ny = 0 \quad \text{(Equation 20)}$$

$$L_n^{(\alpha)}(x) = \left(2 + \frac{\alpha - 1 - x}{n}\right) L_{n-1}^{(\alpha)}(x) - \left(1 + \frac{\alpha - 1}{n}\right) L_{n-2}^{(\alpha)}(x) \quad \text{(Equation 21)}$$

Using Equations 20 and 21, the Laguerre polynomial transform can be derived for rectangular images of size M×N and, as such, can be determined according to Equation 22, wherein $\rho(p, M) = \sum_{x=0}^{M-1} e^{-x} x^\alpha \{L_p^\alpha(x)\}^2$.

$$\ell_{pq} = \frac{1}{\rho(p,M)\rho(q,N)} \sum_{x=0}^{M-1} \sum_{y=0}^{N-1} e^{-x} x^\alpha L_p^\alpha(x) L_q^\alpha(y) f(x,y)$$

(Equation 22)

Figure 4A:
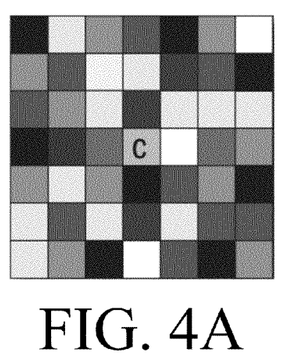
FIGS. 4A-F illustrate alternative LBP encoding schemes.
Figure 4B:
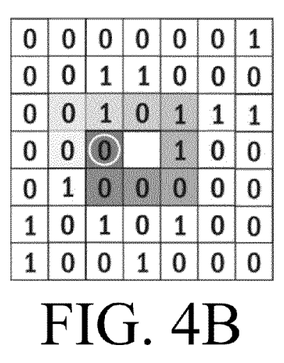
Figure 4C:
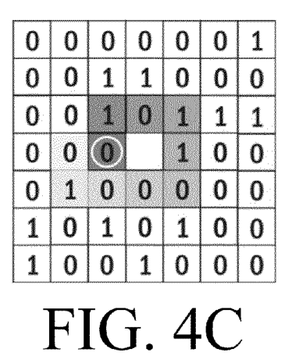
Figure 4D:
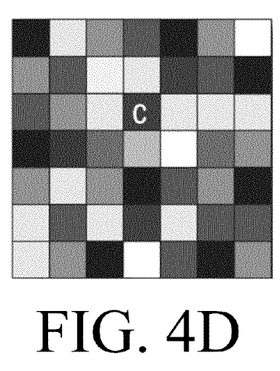
Figure 4E:
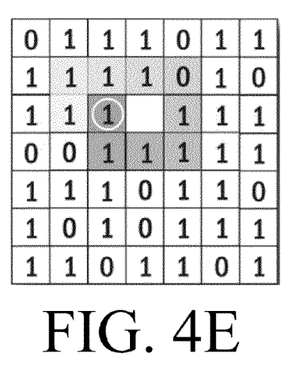
Figure 4F:
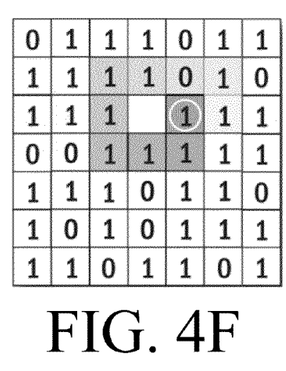

At step 115, an LBP encoding algorithm is executed to encode the first set of transform coefficients into a first encoded data stream. Though in this case LBP encoding is applied to coefficients resulting from a discrete transform, the LBP encoding itself can be performed similarly to typical LBP encoding schemes. Typically, LBP encoding involves comparing a value (intensity in the context of traditional LBP encoding) associated with a central pixel, or pivot or thresholding point, to corresponding values (again, intensity in traditional LBP encoding) of neighboring pixels and generating an encoded data stream corresponding to the comparisons based on an ordering scheme (typically, a "1" is added to the encoded data stream if a pixel has a higher intensity value than the thresholding point, while a "0" is added to the stream if a pixel has a lower intensity value than the thresholding point). Similar LBP-encoding techniques can be used on the discrete-transformation coefficients instead of the pixel intensities. Step 115 may be performed by an LBP encoding algorithm 216 of feature-matching system 200. Exemplary LBP encoding schemes are illustrated in FIGS. 4A-4F, which illustrate two different thresholding-point selections and exemplary ordering schemes. FIGS. 4A and 4D illustrate matrices of data (higher values are illustrated with lighter colors) with different thresholding points (labeled "C"). FIGS. 4B, 4C, 4E, and 4F illustrate different ordering schemes for implementing LBP encoding. It is noted that in each of FIGS. 4B, 4C, 4E, and 4F the thresholding point is the empty box in the grid. In FIG. 4B, the LBP analysis begins with the discrete-transform coefficient value to the left of the thresholding point and moves counter-clockwise through the neighboring values, which generates a data stream of "00001101"; in FIG. 4C, the LBP analysis also begins with the discrete-transform value to the left of the thresholding point but moves clockwise through the neighboring values, which generates a data stream of "01011000". In FIG. 4E, the LBP analysis begins with the discrete-transform value to the left of the thresholding point and moves counter-clockwise through the neighboring values, which generates a data stream of "11111011;" in FIG. 4F, the LBP analysis begins with the discrete-transform value to the right of the thresholding point and moves clockwise through the neighboring values, which generates a data stream of "11111110". In the context of the present disclosure, the LBP encoding algorithm may, for example, assign coefficients to individual squares in a grid, identify one coefficient as a thresholding point, and compare that coefficient to coefficient values associated with neighboring basis images, which, as such, in an exemplary embodiment, would have been assigned to neighboring squares in the grid, in order to generate a first encoded data stream for each image patch. In alternative embodiments, the grid may be implemented with subcomponents having non-square shapes (not shown), such as circles, sectors or portions of sectors, or triangles, among others.

Various modifications to typical LBP encoding schemes can be made in order to improve accuracy. For example, LBP may analyze coefficients in groups of nine (3×3 coefficients), groups of twenty-five (5×5 coefficients), or groups of any other size. Further, the number of neighboring coefficients to be used in the process of performing LBP can be limited, either by setting a particular limit value or by choosing only neighbors according to some selection scheme for comparison. Such a selection scheme may include choosing neighbors only at certain angles and/or at or within a certain radius. As another example, uniform LBP, which constrains that a bit transition happens at most twice in a binary pattern, may not be as useful in the context of the discrete transform coefficient space due to the fact that it is typically less smooth than the image intensity space; as such, non-uniform LBP may be used. Moreover, frequent transition is considered an asset in the context of LBP encoding because, for a given thresholding point, more transitions in the binary code generated through LBP can indicate that the thresholding point has been chosen such that coefficients greater than and less than the thresholding value are balanced.

As indicated by FIGS. 4A-4F, thresholding point and ordering scheme can be judiciously chosen in order to generate more meaningful data streams and, correspondingly, more accurate results, such as by using a non-central and/or varying thresholding center and/or by using a varying ordering scheme. In some implementations, multiple ordering schemes and/or thresholding centers may be used and combined and/or analyzed in to improve accuracy. In some embodiments, optimal ordering may be determined by analyzing permutations of possible ordering schemes in the context of a crossover and mutation genetic algorithm. By permutating each generation of the possible ordering schemes, a fitness function can be derived and used to determine an optimal ordering by analyzing verification performance on a subset of a "training" data set. Though LBP is shown in FIGS. 4B-C and 4E-F as being implemented on a square neighborhood of coefficients surrounding the thresholding point, in some implementations, accuracy may be improved by using a circular neighborhood of coefficients. This may be accomplished by interpolating the coefficients whenever a sampling point is, for example, offset from the center of a coefficient's location in the grid. In cases where coefficients are lacking one or more neighboring coefficients, such as in the case of a "top-left" coefficient in a coefficient matrix, the missing neighbors may be treated as having a constant value, such as zero, may be ignored by the LBP algorithm, or may be filled in in a "wrap-around" nature such that a "bottom-left" coefficient in the coefficient matrix would be considered "above" a "top-left' coefficient and a "top-right" coefficient" would be considered to be located "left" of the "top-left" coefficient. Additionally or alternatively, coefficients associated with other patches and, as such, contained in other grids, could be used in the LBP analysis of a given patch; for example, the LBP algorithm may consider a "left-top" coefficient in a grid for a given patch to be to the "right" of a "right-top" coefficient associated with the patch immediately to the left of the given patch.

Referring again to FIG. 1, at step 120 each of the first encoded data streams generated from each patch is converted into a decimal number so as to create a first decimal-number representation of the region(s) of the first image data comprising the decimal numbers converted from each of the first encoded data streams. The decimal numbers converted from each of the first encoded data streams may be assigned to or associated with the center pixel of each patch. In alternative embodiments, the decimal numbers may be assigned to or associated with any other pixel within the patch, such as a pixel located within a patch at a corresponding location to the thresholding point used in LBP for each grid corresponding to each individual patch (i.e., if the thresholding point corresponds to a coefficient located in row 2, column 2 of a grid, then the corresponding pixel would be located in row 2, column 2 of the patch associated with that grid). For example, through base-2 conversion, a data stream of "11111110" can be converted to a decimal value of "254", though other integer (e.g., 3, 4, etc.) or fractional (e.g., 1.5, 0.87, etc.) bases may be used. By unleashing the traditional restriction to only base 2, much more diversity of LBP encoding can be achieved. Step 120 may be performed by a decimal conversion algorithm 220 of feature-matching system 200; such an algorithm 220 may include various conversion schemes having different bases for conversion.

Figure 6:
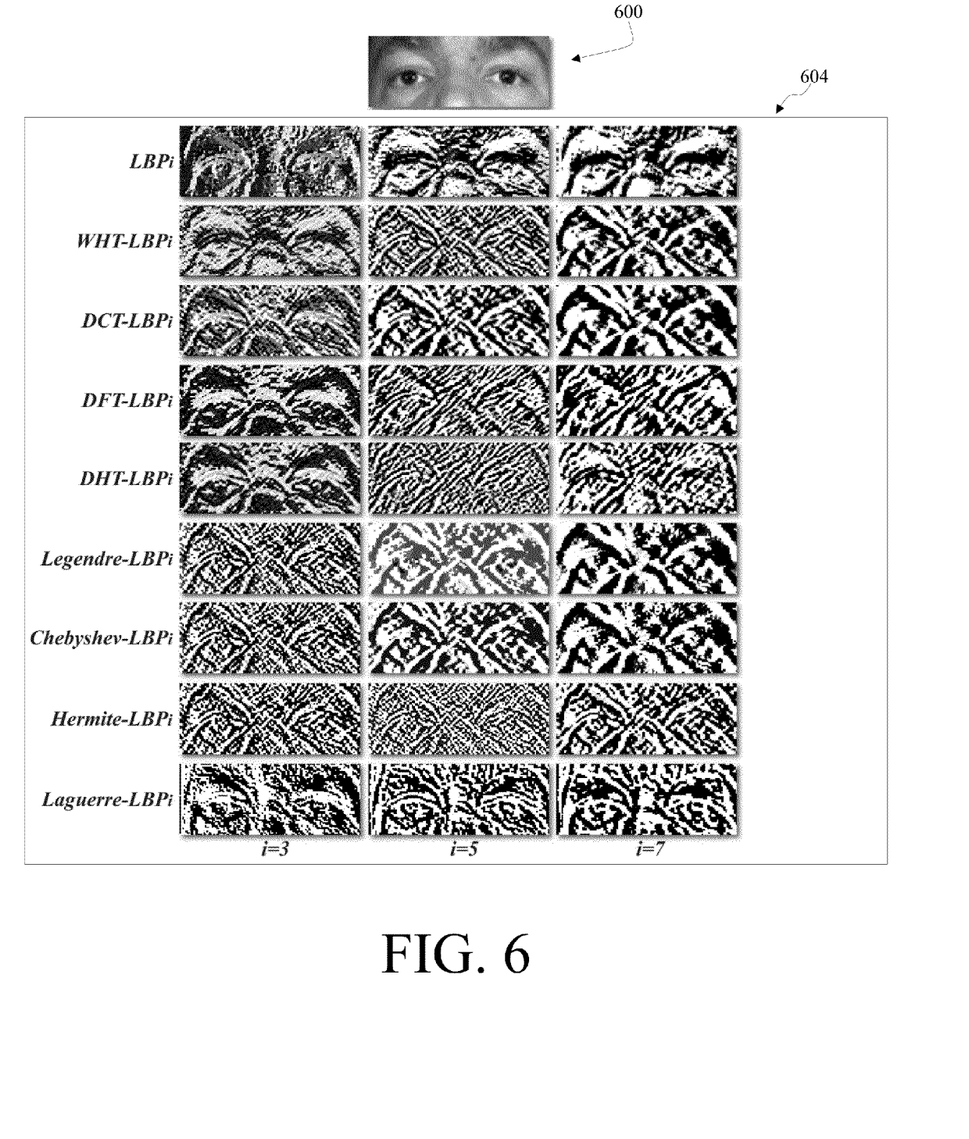
FIG. 6 illustrates periocular images processed with various discrete transforms and three different kernel sizes.

A visual depiction of data generated through the transform, LBP, and decimal conversion steps is provided in FIG. 6, which illustrates a periocular image 600 and corresponding processed images 604 generated through the use of various discrete transforms and three different kernel sizes (i.e., i=3, 5, and 7) each. Individual pixel values in processed images 604 correspond to the decimal number representations assigned to the central pixel of each patch. In order to depict these decimal number representations visually, the decimal numbers are scaled such that the different values can be represented in greyscale. The decimal numbers are not necessarily scaled for the purposes of performing method 100, though such scaled versions of the decimal numbers could also or alternatively be used. In other words, the data represented by processed images 604 is used for the purposes of performing method 100, not necessarily processed images 604 per se or the scaled versions of the decimal numbers used to create processed images 604, though such processed images 604 or scaled versions of the decimal numbers used to implement them could be also or alternatively be used.

At step 125, a matching algorithm is executed for comparing the first decimal-number representation to a second decimal-number representation of one or more region(s) of the second image data. As alluded to above, the second image data may reside in a pre-assembled database of images of known subjects (e.g., persons) to which the first image data is being compared so as to identify the unknown subject of the first image data. It is noted that the feature-matching system that generates the first decimal-number representation need not necessarily generate the second decimal-number representation of the second image data. For example, the images in the pre-assembled database may have already been "pre-processed" such that the data in the database are already decimal-number representations. This may be so in embodiments in which a discrete-transform-based decimal-number representation scheme has become a standard, such that when each image is added to the database, a decimal-number representation is automatically generated as part of the storing process. However, in other examples in which the individual images within a database of comparison images have not been subjected to discrete transformation processing, LBP encoding, and decimal-number representation processing, feature-matching system 200 may perform these steps on the second image data, either singly as needed or as part of a larger step of processing some of all of the images in the database to have the requisite decimal-number representation format. As with the first image data, such second image data may be preprocessed to account for illumination or other image defects or abnormalities. Step 125 may be performed by a matching algorithm 224 of feature-matching system 200; such an algorithm 224 may include various alternative and/or combined matching algorithms. For example, a match may be provided in the form of a single image or image indicator (such as a filename or hash code), which may optionally be provided with a corresponding confidence factor indicating an amount of correlation between the source and match images. Alternatively, a match may be provided in the form of a set of images or image indicators, each of which may be provided with corresponding confidence factors. Methods of calculating confidence intervals and the like are well known in the art and, accordingly, will not be described in detail. It is important to note that although match 208 is represented outside of feature-matching system 200 in FIG. 2, match 208 may be stored in feature-matching system using an appropriate computer storage system (see, e.g., FIG. 7). Match 208 may be transmitted to a database, through the Internet, to a security system, and/or in any other manner known in the art to be suitable for providing image recognition results.

Figure 5:
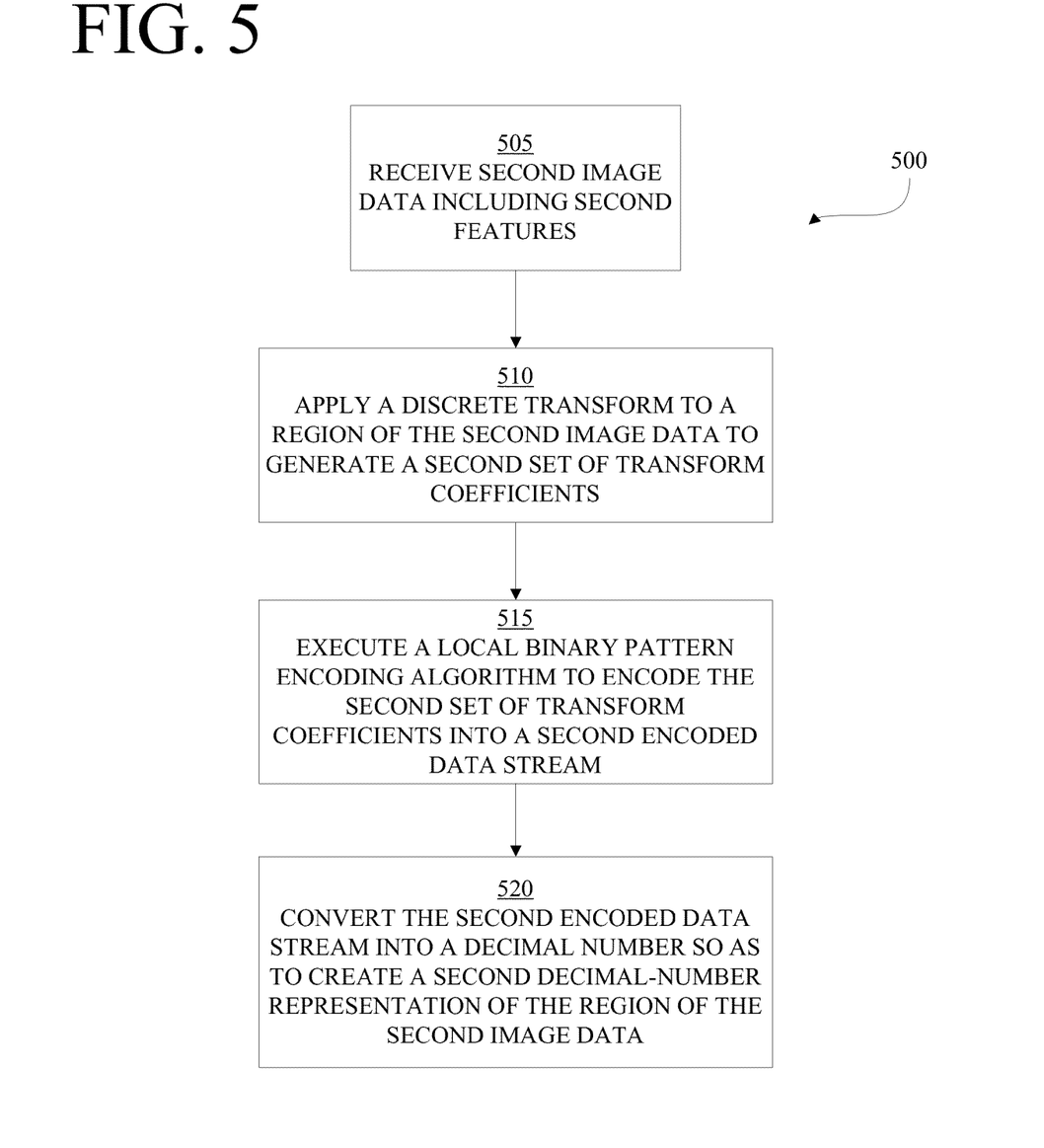
FIG. 5 is a flow diagram illustrating a method of generating a decimal-number representation of a region of image data.

For the sake of completeness, FIG. 5 illustrates an exemplary method 500 of generating a decimal-number representation of one or more regions of the second image data. As can be readily seen, steps 505 to 520 are performed in substantially the same way as corresponding respective steps 105 to 120 of FIG. 1 and, so, will not be described in detail. It is noted that whatever discrete transform is implemented for the processing of the first image data, the same discrete transform should be used for processing the second image data, though two or more different discrete transforms could be used simultaneously to improve accuracy. Likewise, the particular LBP-encoding algorithm and the same decimal-number converting scheme should be used as between the first image data and the second image data, though two or more different LBP-encoding algorithms and/or decimal-number converting schemes could be used simultaneously to improve accuracy. By comparing decimal number representations generated in the manner described above for differing images, accurate feature matching can be performed. Decimal number representations can be compared on a one-to-one basis between images or, if a database of "training" images is available, subspace modeling can be performed in order to improve accuracy.

Any of various subspace modeling techniques can be judiciously chosen and applied to improve accuracy, including principle component analysis (PCA), unsupervised discriminant projection (UDP), kernel class-dependence feature analysis (KCFA), and kernel discriminant analysis (KDA), among others. For example, if PCA is used, the covariance matrix of the vectorized input data with zero mean is computed; as such, PCA will determine the projection direction that maximizes the variance and can be solved by finding the eigenvalues of the covariance matrix. Alternatively or additionally, a UDP may be used, which is an unsupervised classification method where training labels are not taken into account and which has the ability to comprise both local and non-local information.

Further alternatively or additionally, KCFA may be used, which is designed to overcome the potential difficulties presented by nonlinear distortions in human face appearance variations. KFCA can be implemented to represent nonlinear features by mapping into a higher dimensional feature space which allows higher order correlations in kernel spaces. In KFCA, features in the higher dimensional space are obtained by using inner products of the linear space without actually forming the higher dimensional feature mappings. This kernel trick improves efficiency and keeps the computation tractable even with the high dimensionality. Examples are kernel eigenfaces and kernel Fisherfaces. The mapping function can be denoted as: $\Phi:\mathbb{R}^N \to F$. Kernel functions are defined according to Equation 23, which can be used without having to form the mapping $\Phi(x)$ as long as kernels form an inner product and satisfy Mercer's theorem.

$$K(x,y) = \langle \Phi(x), \Phi(y) \rangle \quad \text{(Equation 23)}$$

The correlation filter is applied to a test image in order to produce a correlation output. In some scenarios, it may be sufficient to calculate only inner products to produce correlation output; this can save significant computational expense.

Still further alternatively or additionally, KDA may be used, which extends linear discriminant analysis nonlinearly. As is known in the art, KDA can be implemented through generalized eigen analysis.

FIG. 7 shows a diagrammatic representation of one embodiment of a computer in the exemplary form of a computer system 700 that contains a set of instructions for implementing any one or more of the aspects and/or methodologies of the present disclosure, including implementing system 200 and any of the methods of the present disclosure, or portion(s) thereof, such as either of methods 100 and 500 of FIGS. 1 and 5, respectively, or any portion(s) thereof. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable storage media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable storage medium 728 may provide nonvolatile and/or volatile storage of machine-readable instructions, data structures, program modules, and/or other data for computer system 700. In one example, software 720 may reside, completely or partially, within machine-readable storage medium 728. In another example, software 720 may reside, completely or partially, within processor 704. It is noted that the term "machine-readable storage medium" does not include signals present on one or more carrier waves.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740 may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. In addition to a display device, a computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of matching first features of first image data with second features of second image data, comprising:
   receiving, by a feature-matching system, the first image data;
   applying, by the feature-matching system, a discrete transform to a region of the first image data containing the first features so as to generate a first set of transform coefficients;

executing, by the feature-matching system, a local binary pattern (LBP) encoding algorithm to encode the first set of transform coefficients into a set of first encoded data streams;

converting, by the feature-matching system, each of the first encoded data streams into a decimal number so as to create a first decimal-number representation of the region of the first image data; and executing, by the feature-matching system, a matching algorithm for determining a match as a function of the first decimal number representation and a second decimal representation of a region of the second image data containing the second features.

2. A method according to claim 1, further comprising:

receiving, by the feature-matching system, the second image data;

applying, by the feature-matching system, the discrete transform to the region of the second image data containing the second features so as to generate a second set of transform coefficients;

executing, by the feature-matching system, the LBP encoding algorithm to encode the second set of transform coefficients into a set of second encoded data streams; and converting, by the feature-matching system, each of the second encoded data streams into a decimal number so as to create the second decimal-number representation of the second image data.

3. A method according to claim 1, wherein said executing an LBP encoding algorithm includes executing an LBP algorithm using ordering determined as a function of a fitness function derived by permutating generations of possible ordering schemes.

4. A method according to claim 3, wherein said executing an LBP encoding algorithm includes executing an LBP encoding algorithm implementing a non-central thresholding center.

5. A method according to claim 3, wherein said executing an LBP encoding algorithm includes executing an LBP algorithm that selects active neighbors according to a selection scheme that considers angle and/or radius.

6. A method according to claim 3, wherein said executing an LBP encoding algorithm includes executing an LBP algorithm using, for decimal conversion, a base other than base 2.

7. A method according to claim 6, wherein said using a base other than base 2 includes using a fractional base.

8. A method according to claim 1, wherein said applying a discrete transform includes applying a Walsh-Hadamard transform.

9. A method according to claim 1, wherein said applying a discrete transform includes applying a discrete cosine transform.

10. A method according to claim 1, wherein said applying a discrete transform includes applying a discrete Fourier transform.

11. A method according to claim 1, wherein said applying a discrete transform includes applying a discrete Hartley transform.

12. A non-transitory machine-readable storage medium containing machine-executable instructions for performing a method of matching first features of first image data with second features of second image data, said machine-executable instructions comprising:

a first set of machine-executable instructions for receiving the first image data;

a second set of machine-executable instructions for applying a discrete transform to a region of the first image data containing the first features so as to generate a first set of transform coefficients;

a third set of machine-executable instructions for executing a local binary pattern (LBP) encoding algorithm to encode the first set of transform coefficients into a set of first encoded data streams;

a fourth set of machine-executable instructions for converting each of the first encoded data streams into a decimal number so as to create a first decimal-number representation of the region of the first image data; and a fifth set of machine-executable instructions for executing a matching algorithm for determining a match as a function of the first decimal number representation and a second decimal representation of a region of the second image data containing the second features.

13. A non-transitory machine-readable storage medium according to claim 12, further comprising:

a sixth set of machine-executable instructions for receiving the second image data;

a seventh set of machine-executable instructions for applying the discrete transform to the region of the second image data containing the second features so as to generate a second set of transform coefficients;

an eighth set of machine-executable instructions for executing the LBP encoding algorithm to encode the second set of transform coefficients into a set of second encoded data streams; and a ninth set of machine-executable instructions for converting each of the second encoded data streams into a decimal number so as to create the second decimal-number representation of the second image data.

14. A non-transitory machine-readable storage medium according to claim 12, wherein said third set of machine-executable instructions includes machine-executable instructions for executing an LPB algorithm using ordering determined as a function of a fitness function derived by permutating generations of possible ordering schemes.

15. A non-transitory machine-readable storage medium according to claim 14, wherein said third set of machine-executable instructions includes machine-executable instructions for executing an LBP encoding algorithm implementing a non-central thresholding center.

16. A non-transitory machine-readable storage medium according to claim 14, wherein said third set of machine-executable instructions includes machine-executable instructions for executing an LBP algorithm that selects active neighbors according to a selection scheme that considers angle and/or radius.

17. A non-transitory machine-readable storage medium according to claim 14, wherein said third set of machine-executable instructions includes machine-executable instructions for executing an LBP algorithm using, for decimal conversion, a base other than base 2.

18. A non-transitory machine-readable storage medium according to claim 17, wherein said third set of machine-executable instructions includes machine-executable instructions for executing an LBP algorithm using a fractional base.

19. A non-transitory machine-readable storage medium according to claim 12, wherein said second set of machine-executable instructions includes machine-executable instructions for applying a Walsh-Hadamard transform.

20. A non-transitory machine-readable storage medium according to claim 12, wherein said second set of machine-executable instructions includes machine-executable instructions for applying a discrete cosine transform.

21. A non-transitory machine-readable storage medium according to claim 12, wherein said second set of machine-executable instructions includes machine-executable instructions for applying a discrete Fourier transform.

22. A non-transitory machine-readable storage medium according to claim 12, wherein said second set of machine-executable instructions includes machine-executable instructions for applying a discrete Hartley transform.

* * * * *